(12) United States Patent
Damore et al.

(10) Patent No.: US 7,334,660 B2
(45) Date of Patent: Feb. 26, 2008

(54) SEAL ASSEMBLY FOR A RACK AND PINION STEERING ASSEMBLY

(75) Inventors: Michael J. Damore, Sterling Heights, MI (US); Richard A. Stoll, Royal Oak, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 201 days.

(21) Appl. No.: 11/095,750

(22) Filed: Mar. 31, 2005

(65) Prior Publication Data

US 2006/0219467 A1   Oct. 5, 2006

(51) Int. Cl.
*B62D 3/12*   (2006.01)

(52) U.S. Cl. .................. 180/428; 277/586; 277/585

(58) Field of Classification Search ............... 180/428, 180/417, 439; 277/586, 585; 92/168
See application file for complete search history.

(56) References Cited

U.S. PATENT DOCUMENTS

| | | | |
|---|---|---|---|
| 6,155,375 A | * | 12/2000 | Gierc et al. ............... 180/428 |
| 6,176,343 B1 | | 1/2001 | Vincent et al. |
| 6,330,929 B1 | * | 12/2001 | Gierc et al. ............... 180/428 |
| 6,467,566 B1 | | 10/2002 | Harer et al. |
| 6,644,430 B2 | | 11/2003 | Harer et al. |
| 2003/0057010 A1 | * | 3/2003 | Harer et al. ............... 180/428 |

* cited by examiner

*Primary Examiner*—Tony Winner
(74) *Attorney, Agent, or Firm*—MacMillan, Sobanski & Todd, LLC (57) ABSTRACT

A rack bushing seal assembly for a rack and pinion steering assembly that includes a bushing, a bushing liner and a locking material. The bushing defines an annular recess on an outer surface of the bushing. The bushing liner is positioned within the bushing. The locking material is positioned within the annular recess for retaining the rack bushing seal assembly within a rack tube. A rack bushing seal assembly also includes a bushing having a first annular flange with a pressure port formed therein, and a first tube portion with a channel portion formed therein, wherein the pressure port is in fluid communication with the channel portion. The rack bushing seal assembly also includes a bushing liner having a second annular flange and a second tube portion, the bushing liner being positioned within the first tube portion of the bushing. A rack tube is placed in abutting arrangement with the first annular flange of the bushing wherein the channel portion is in fluid communication with the rack.

21 Claims, 5 Drawing Sheets

SEAL ASSEMBLY FOR A RACK AND PINION STEERING ASSEMBLY

BACKGROUND OF THE INVENTION

This invention relates in general to a rack and pinion steering assembly, and more particularly relates to a seal assembly for use within the rack and pinion steering assembly.

A typical rack and pinion steering assembly has a housing containing a rack and a pinion. The rack has a longitudinally extending row of rack teeth in meshing engagement with helical gear teeth on the pinion. The opposite ends of the rack project outward from the housing and are connected with a steering linkage and a corresponding pair of steerable vehicle wheels. The pinion is connected with the vehicle steering wheel by an input shaft and a torsion bar. When a steering maneuver is being performed the pinion rotates and the rack moves longitudinally. The housing also contains a spring loaded yoke that presses the rack against the pinion to maintain the rack teeth in meshing engagement with the gear teeth on the pinion.

Typical power-assisted rack and pinion steering assemblies include a valve portion that uses hydraulic power to assist the steering operation of the vehicle. A valve assembly is formed within the valve portion and includes the input shaft, the torsion bar, a valve sleeve and a pinion gear. When the rack and pinion steering assembly is mounted in a vehicle, the input shaft is connected to a steering wheel. Rotation of the steering wheel results in rotation of the input shaft. The input shaft is fixed relative to the end of the torsion bar so that rotation of the input shaft results in rotation of the end of the torsion bar. Torsion of the torsion bar causes a valve core to move relative to a valve sleeve.

In a neutral position, hydraulic fluid flows from a source through passages in the valve sleeve. An equal amount of fluid is directed toward opposed passages in the valve sleeve. Since an equal amount of fluid is directed through each passage, the pressure within the system is balanced. When a steering operation is performed, the valve core is rotated relative to the valve sleeve and the valve assembly moves out of the neutral position, or is actuated, and fluid is directed toward a rack section. A piston divides the rack section into two chambers so that depending on which way the steering wheel is rotated, fluid can flow to either a left or right chamber to facilitate movement of the rack. A higher pressure in a first chamber relative to the pressure in the second chamber results in a differential pressure that causes the piston to move. When the piston moves, the rack moves and the steerable wheels are turned.

To prevent hydraulic fluid from flowing out of the chamber, it is necessary to seal the ends of the chamber through which the rack projects. It is also desirable to support the rack for axial movement within the chamber without losing the integrity of the seal. A bushing and seal assembly is typically used for this purpose. It is known to enclose the ends of the chamber with bellows attached to the housing to prevent the ingress of moisture, dirt, or other contaminant into the housing and bearing surfaces.

SUMMARY OF THE INVENTION

This invention relates to a rack bushing seal assembly for a rack and pinion steering assembly that includes a bushing defining an annular recess on an outer surface of the bushing, a bushing liner positioned within the bushing, and a locking material positioned within the annular recess for retaining the rack bushing seal assembly within a rack tube.

The invention also relates to a rack bushing seal assembly that includes a bushing having a first annular flange with a pressure port formed therein, and a first tube portion with a channel portion formed therein. The pressure port is in fluid communication with the channel portion. The assembly includes a bushing liner having a second annular flange and a second tube portion, the bushing liner being positioned within the first tube portion of the bushing. The assembly also includes a rack tube placed in abutting arrangement with the first annular flange of the bushing wherein the channel portion is in fluid communication with the rack.

The invention also relates to a rack bushing seal for an outboard end of a rack tube in a rack and pinion steering assembly. The assembly includes a bushing having a first annular flange with a pressure port formed therein, and a first tube portion with a channel portion formed therein. The pressure port is in fluid communication with the channel portion, and the first tube portion of the bushing has an annular recess formed on an outer surface thereof. A bushing liner having a second annular flange and a second tube portion is also included. The second tube portion of the bushing liner is positioned within the first tube portion of the bushing. The rack tube is in abutting arrangement with the first annular flange of the bushing such that the channel portion is in fluid communication with the rack tube and a locking material is positioned within the annular recess for retaining the rack bushing seal within the rack tube.

Other advantages of this invention will become apparent to those skilled in the art from the following detailed description of the preferred embodiment, when read in light of the accompanying drawings.

DETAILED DESCRIPTION OF THE PREFERRED EMBODIMENTS

Figure 1:
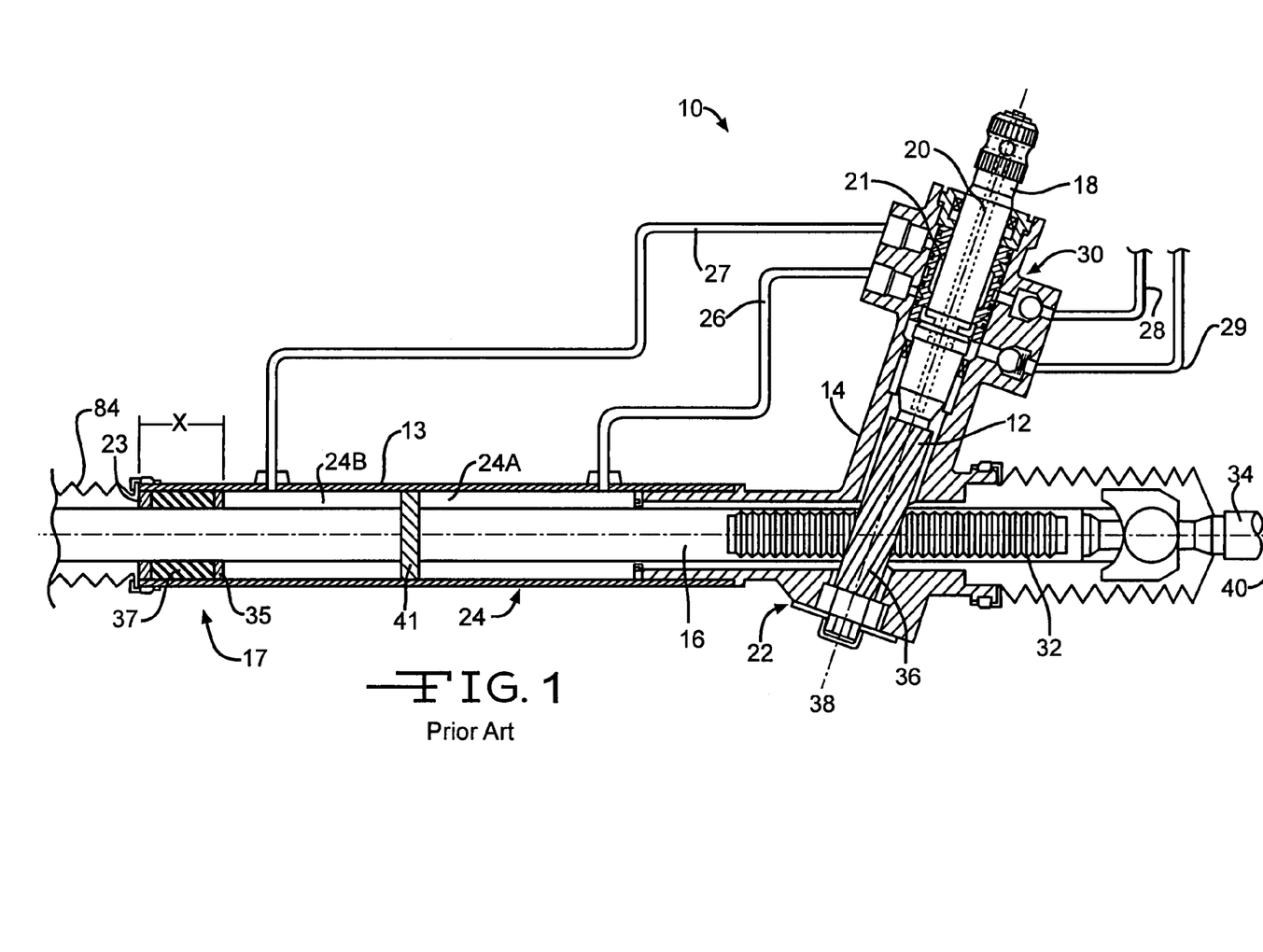
FIG. 1 is a sectional view of a portion of a prior art rack and pinion steering assembly.

Referring now to the drawings, there is illustrated in FIG. 1 a sectional view of a portion of a prior art power assisted rack and pinion steering assembly, indicated generally at 10. The prior art steering assembly 10 includes a pinion 12, a housing 14, a rack 16, an input shaft 18, and a torsion bar 20. It can be appreciated that while the prior art power assisted steering assembly 10 described below is a hydraulically assisted power steering assembly, the prior art steering assembly could also be an electronically controlled power steering assembly.

The housing 14 has a hydraulic valve section 30 and a transversely extending rack tube 13 including a rack portion 22 through which the rack 16 extends. The rack portion 22 is preferably integrally formed as a part of the housing 14. The rack tube 13 can be formed integrally with or separately from the rack portion 22. As shown, the rack tube 13 is formed as a separate generally tubular member that is attached to the housing 14. The rack tube 13 is typically attached to the rack portion 22 of the housing 14 by press fitting the components together. A rack chamber 24 is defined by the rack tube 13. Hydraulic conduits 26 and 27 provide fluid communication between the rack chamber 24 and the valve section 30 of the housing 14. Hydraulic conduits 28 and 29 provide fluid communication between the valve section 30, a power steering pump (not shown) and a reservoir (not shown).

A piston 41 is connected to the rack 16 and is disposed in the rack chamber 24. The piston 41 separates the rack tube 13 into a first chamber 24A and a second chamber 24B. Fluid from the valve section 30 can selectively be supplied to at least one of the first chamber 24A and second chamber 24B depending on the steering maneuver being performed. The rack 16 includes a section having rack teeth 32. The rack teeth 32 mesh with helical teeth 36 of the pinion 12 inside the housing 14. Opposite ends of the rack 16 are connected with steerable vehicle wheels (not shown) by pivotable tie rods, one of which is shown at 34, as is known in the art. When a steering maneuver is performed, the pinion 12 rotates about a pinion axis 38 and the rack 16 moves longitudinally along a horizontal rack axis 40.

The prior art power-assisted rack and pinion steering assembly 10 also includes a rack yoke (not shown). The rack yoke is a substantially cylindrical part with a concave face centered on an axis that is generally perpendicular to the rack axis 40. The rack yoke is conventionally contained in a cylindrical section of the housing 14 between a closure cap and the rack 16. A spring is compressed between the rack-yoke and the closure cap. The spring applies an axially directed pre-loading force which urges the concave face of the rack yoke forcefully against the rack 16. The rack yoke in turn applies the pre-loading force to the rack 16 so as to hold the rack teeth 32 firmly in mesh with the helical teeth 36 on the pinion 12.

A portion of a valve assembly 11 includes several of the components listed above including the pinion 12, the input shaft 18, the torsion bar 20, and a valve sleeve 21. The valve section 30 communicates with the first chamber 24A through a first two-way hydraulic conduit 26. The valve section 30 communicates with the second chamber 24B through a second two-way hydraulic conduit 27. The valve section 30 receives hydraulic fluid from a reservoir and a pump through an inlet hydraulic conduit 28. The pump could be a flow-varying pump, and could be driven by an electric motor or by the vehicle engine. An outlet hydraulic conduit 29 exhausts hydraulic fluid from the valve section 30 to the reservoir.

The valve section 30 operates in response to rotation of the input shaft 18. When the input shaft 18 rotates in a first direction about the pinion axis 38, it rotates slightly relative to the pinion 12. The torsion bar 20 flexes to permit such rotation of the input shaft 18 relative to the pinion 12. The valve section 30 responds to the resulting rotational displacement by opening hydraulic fluid flow paths that extend through the valve section 30 from the inlet conduit 28 to the second two-way flow conduit 27. The valve section 30 simultaneously closes the hydraulic fluid flow paths that extend through the valve section 30 from the inlet hydraulic conduit 28 to the first two-way flow conduit 26 to the outlet conduit 29. A resulting flow of hydraulic fluid from the pump causes a hydraulic fluid pressure differential acting across the piston 41 due to a higher pressure in the second chamber 24B than the first chamber 24A. This causes the piston 41 and the rack 16 to move to the right, as viewed in FIG. 1, along the axis 40. This causes the steering linkage to steer the vehicle wheels in a first direction. When the torsion bar 20 is in a neutral position, the valve section 30 is in a "normally open" position. That is, there is a fluid flow from conduit 28, through the valve sleeve 21 and out of the conduit 29. The fluid pressure will be balanced within the rack chamber 24 as will the fluid pressure within conduits 26 and 27. Therefore, when the steering wheel is turned, the valve section 30 becomes further opened, thereby allowing fluid to flow through one of the conduits 26, 27 to the rack chamber 24.

As the piston 41 causes the rack 16 to move along the rack axis 40, the pinion 12 rotates in meshing engagement with the rack teeth 32. The pinion 12 then rotates about the pinion axis 38 relative to the input shaft 18 in a follow-up manner so as to cancel the rotational displacement between the pinion 12 and the input shaft 18. The valve section 30 responds by returning the previously opened hydraulic fluid flow paths (conduit 28 to conduit 27) to a closed position and returns the valve section 30 to its neutral position. This equalizes the hydraulic fluid pressures acting on the piston 40 in the two rack chambers and causes the piston 41 and the rack 16 to stop moving along the rack axis 40.

When the vehicle wheels are to be steered in an opposite direction, the input shaft 18 is rotated in an opposite direction about the pinion axis 38, and is again rotated slightly relative to the pinion 12 upon the flexing of the torsion bar 20. The valve section 30 responds by pressurizing the first rack chamber 24A and by simultaneously exhausting the second rack chamber 24B. The piston 41 and the rack 16 then move axially to the left, as viewed in FIG. 1. A resulting follow-up rotation of the pinion 12 relative to the input shaft 18 causes the valve section 30 again to equalize the hydraulic fluid pressures in the two rack chambers 24A and 24B.

Positioned at the outboard end of the rack tube 13 is a generally conventional rack seal assembly 17. The seal assembly 17 includes a bushing 35, a seal portion 37, and a retaining cap 23. The seal portion 37 can be an elastomeric or rubber member that is positioned against the rack 16 to act as a seal that abuts the rack housing 13. The retaining cap 23 can be threadably connected to the rack tube 13, or can be secured to the rack tube 13 using a wire winding (not shown) that is retained within a groove formed on the inner surface of the rack tube 13. The rack seal assembly 17 has an overall length, X. Since the rack seal assembly 17 is configured to seal the rack tube 13 from leaking fluid, it is anticipated that the fluid from the rack chamber 24B does not pass beyond the bushing 35. As can be seen in FIG. 1, the rack seal assembly 17 reduces the amount of the rack 16 that is exposed to the fluid, by the length X, from the rack chamber 24*b*.

It can be appreciated that the form, function and operation of a power assisted rack and pinion steering assembly, such as described above, is generally known in the art. It should also be appreciated that a power assisted rack and pinion steering assembly similar to the one described above can be modified as will be described below with respect to the present invention. However, the basic operation of the present invention can be substantially similar to that which was described above.

Figure 2:
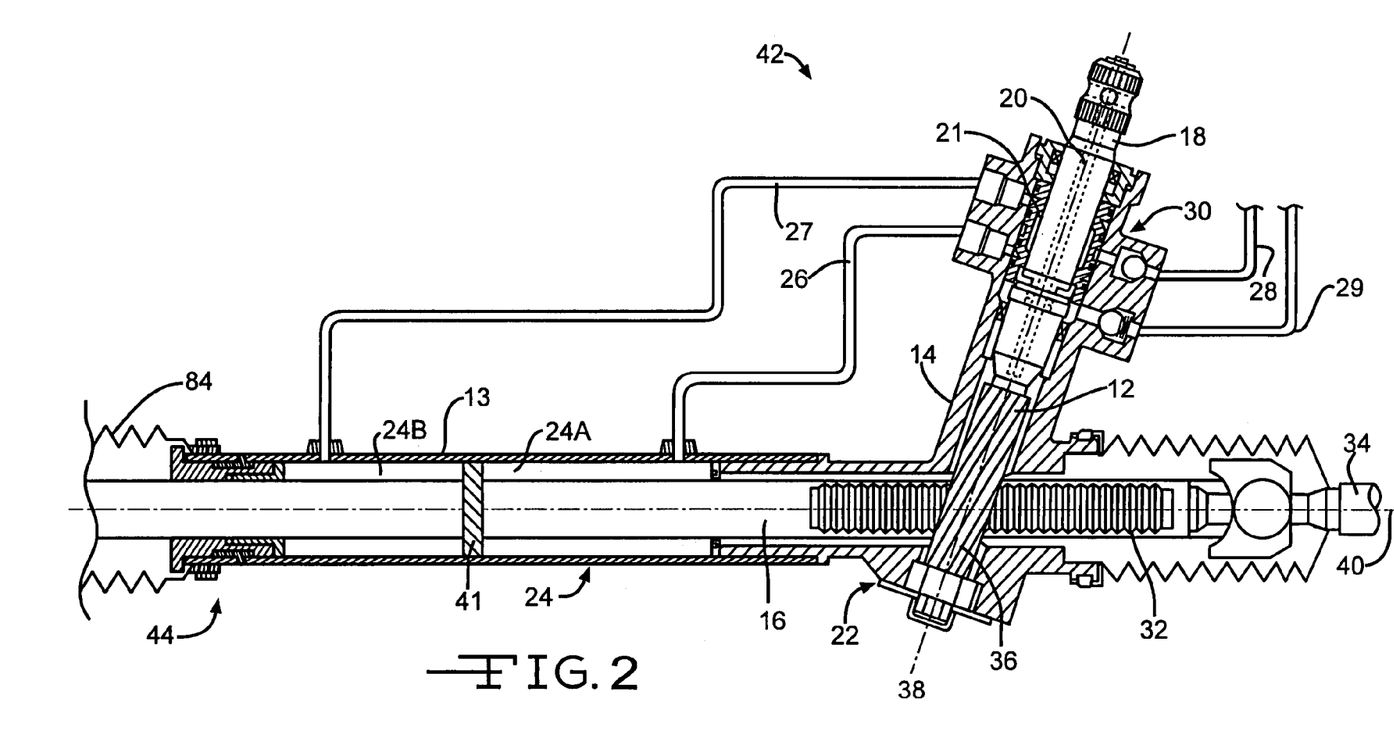
FIG. 2 is a sectional view of a portion of a rack and pinion steering assembly including the rack bushing seal assembly according to the present invention.

Illustrated in FIG. 2 there is shown a sectional view of a portion of a power assisted rack and pinion steering assembly 42 according to the present invention. With respect to FIG. 2, like parts (relative to FIG. 1) are given like reference numerals. The rack and pinion steering assembly 42 includes a rack bushing seal assembly 44 according to the present invention. As can be seen in FIG. 2, the rack bushing seal assembly 44 according to the present invention is located at the opposite (outboard) end from the rack housing 14. Locating the rack bushing seal assembly 44 opposite the housing 14 replaces the prior art seal assembly 17 that is located at that end of the rack and pinion steering assembly 10 shown in FIG. 1.

Figure 3:
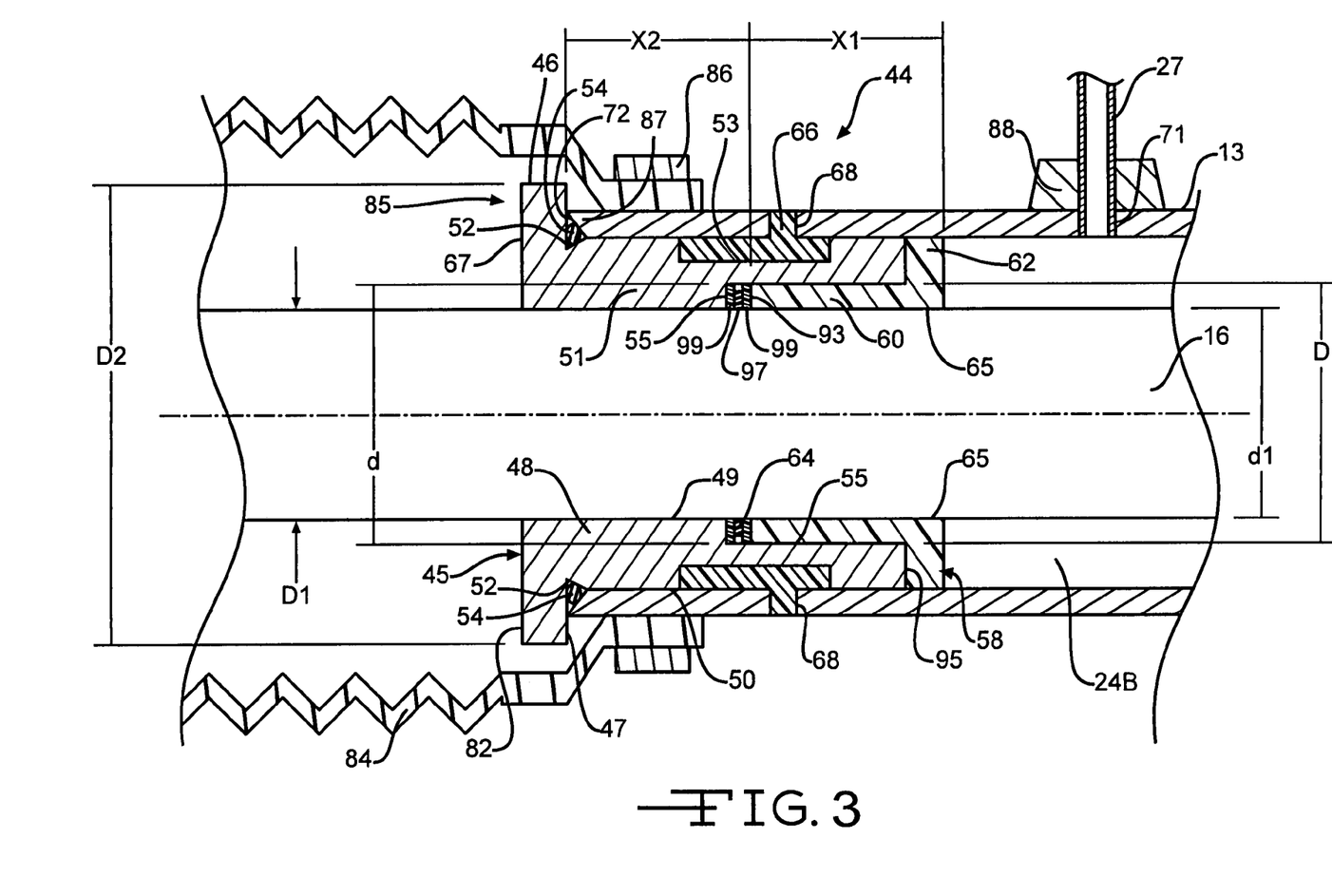
FIG. 3 is an enlarged sectional view of a portion of the rack and pinion steering assembly of FIG. 2 having the rack bushing seal assembly according to the present invention.

Illustrated in FIG. 3 there is shown an enlarged sectional view of the rack bushing seal assembly 44 to show the components of the assembly 44 more clearly. One of the components of the rack bushing seal assembly 44 is a bushing 45. The bushing 45 preferably is made from a powdered metal material. However, it will be appreciated that the bushing 45 can be made using any suitable material such as zinc.

The bushing 45 is a substantially hollow member defined by a first annular flange 46 and a tube portion 48 extending from an inner face 47 of the first flange 46. An inner surface 49 of the tube portion 48 of the bushing 45 defines an inner diameter that is approximately the same as the outer diameter, D1, of the rack tube 16. However, the inner surface 49 preferably includes a step 51, the purpose of which will be described in greater detail below, and an increased diameter portion 55. An outer surface 50 of the bushing 45 can have any desired profile. In the preferred embodiment, the outer surface 50 has a first annular groove 52 formed thereon adjacent the inner face 47 of the first flange 46. The groove 52 is configured to receive and retain a sealing member 54, such as an O-ring, therein. Adjacent the groove 52, the outer surface 50 extends away from the first flange 46. Also formed on the outer surface 50 of the tube portion 48 is a recess 53. The purpose of the recess 53 on the outer surface 50 of the bushing 46 will be described in greater detail below in the context of the operation of the rack bushing seal assembly 44.

Positioned adjacent the step 51 is a second sealing member 64, which preferably is a quad-type O-ring. As with the first O-ring 54, the second sealing ring 64 includes a rubber O-ring. However, in the preferred embodiment, the second sealing ring 64 is a quad-type O-ring, as can be seen more clearly in FIG. 4, which is a combination of a rubber O-ring 97 sandwiched between a pair of nylon rings 99. It should also be appreciated that the seals, one or both of the seal members 54 and 64, can be modified using any suitable seal mechanism to substantially prevent the passage of fluid from the rack chamber 24B beyond the end of the rack tube 13. As can be seen in the Figures, the sealing member 54 seals a joint between the rack tube 13 and the bushing 45. The sealing ring 64 seals a joint between the bushing 45 and a bushing liner 58, described next.

The rack bushing seal assembly 44 further includes the bushing liner 58 positioned within the bushing 45 and is operative to retain the second O-ring 64 between the bushing liner 58 and the bushing 45. The bushing liner 58 is a substantially hollow member, preferably made of a molded low friction material (such as plastic), that is defined by a second annular flange 62 and a second tube portion 60. It is preferred that the outer diameter, d, of the second tube portion 60 is slightly greater than the inner diameter, D, of the flat portion 55 of the tube portion 48 of the bushing 45 so that the bushing liner 48 can be press fit within the tube portion 48 of the bushing 45. The overall length of the bushing liner 58 is such that when the second flange 62 abuts the end 95 of the bushing 45, an end 93 of the second tube portion 60 abuts the second (quad-type) O-ring 64. Thus, the bushing liner 58 helps to maintain the position of the second O-ring 64 between the bushing liner 58 and the bushing 45.

Figure 4:
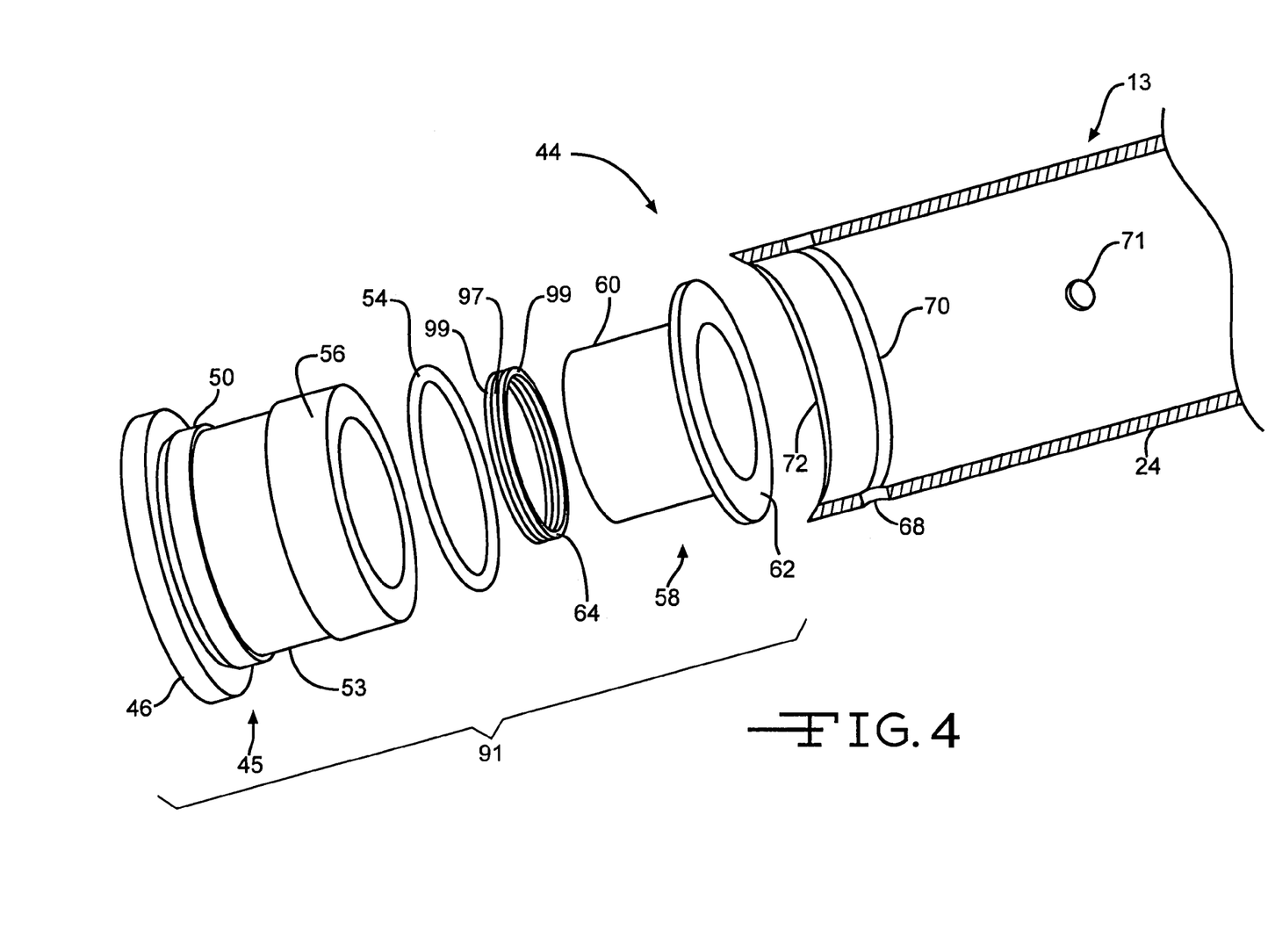
FIG. 4 is an exploded perspective view of the rack bushing seal assembly according to the present invention.

The assembled bushing 45 and bushing liner 58 comprise a rack bushing seal 91 (indicated in FIG. 4). The rack bushing seal assembly 44 comprises the rack bushing seal 91 being connected to the rack tube 13. An inner surface 65 of the bushing liner 58 and the inner diameter, d1, of the tube portion 48 (particularly, of the step 51) are preferably equally sized and generally correspond to the outer diameter, D1, of the rack 16. To form a substantially sealing arrangement, there is a close tolerance between the inner surface 65 of the bushing liner 58 and the outer surface of the rack 16. In addition, the second O-ring 64 helps maintain a sealing arrangement between the rack bushing seal assembly 44 and the rack 16. Particularly, this part of the seal helps to prevent external liquids or contaminants from entering between the rack 16 and the bushing 45. Since the O-ring 64 seals against the surface of the rack 16, hydraulic fluid will preferably not pass beyond the O-ring 64.

The rack bushing seal assembly 44 is positioned at the outboard end of the rack and pinion steering assembly 42. In particular, the rack bushing seal assembly 44 is positioned within the rack tube 13 of the rack and pinion steering assembly 42. An outer face 67 of the first flange 46 also serves as a partial end cap for the rack tube 13. However, it can be appreciated that the rack 16 generally extends beyond the end of the rack tube 13 and the rack bushing seal assembly 44. As with the opposite end of the rack and pinion steering assembly 42 described above, the end of the rack 16 is connected with a steerable vehicle wheel (not shown) by a pivotable tie rod that is substantially the same as the tie rod 34 shown in FIG. 2, as is known in the art. When a steering maneuver is being performed, the pinion 12 rotates about the pinion axis 38, and the rack 16 moves longitudinally along a horizontal rack axis 40 thereby turning the wheels. As can also be seen in FIG. 3, the end 87 of the rack tube 13 abuts the inner face 47 of the first flange 46. Thus, it is preferred that the outer diameter, D2, of the first flange 46 is substantially the same as, or slightly larger than, the outer diameter, D1, of the rack tube 13 to allow the first flange 46 to act as a stop against the end 87 of the rack tube 13. A portion 85 of the first flange 46 of the bushing 45 that extends radially outwardly beyond the outer diameter, D1, of the rack tube 13 forms a lip 82. The lip 82 can be used as a locator mechanism for, and to assist with, the retention of a bellows 84. The bellows 84 is generally conventional in the art and is used to protect the tie rod 34 and the end of the rack tube 13. The bellows 84 is typically retained on the rack tube 13 by a clamp 86. The position of the clamp 86 is preferably such that it does not interfere with openings 68, described below.

Illustrated in FIG. 4 is an exploded perspective view of the rack bushing seal assembly 44 according to the present invention. In this view, some additional features of the seal assembly 44 can be more clearly seen. In particular, the rack tube 13 (shown in a sectional view) includes a pair of openings 68 formed through the rack tube 13. The openings 68 are connected by a channel 70. The channel 70 is preferably substantially aligned with a portion of the recess 53. The purpose of the openings 68 and channel 70 is to further assist with securing the rack bushing seal assembly 44 with the rack tube 13. In particular, a locking material 66 can be inserted or injected via one or more of the openings 68 to "lock" or affix the rack bushing seal 44 and the rack tube 13 together. In the preferred embodiment, the locking material 66 is a hard setting material can be either a plastic, resin, or a metal material.

In the preferred embodiment, a vacuum can be created at one of the openings 68 as material is introduced into the other of the openings 68 in order to force or draw the locking material 66 around the entire recess 53 of the bushing 45. It is also preferred that the locking material 66 fills the channel 70. Thus, the locking material 66 locks the rack bushing seal 91 in place within the rack tube 13. As can be appreciated, the term "lock" does not necessarily mean that the components are permanently joined together, although that is the preferred embodiment. Rather, the term "lock" as used herein can mean that the components are relatively secured together such that the components are held together in a substantially rigid manner such that they can operate as a unit during the operation of the rack and pinion steering assembly 42. Additionally, the locking material 66 can prevent leaking and movement of the bushing 45 relative to the rack tube 13.

In FIG. 4, it can also be seen that the end of the rack tube 13 is formed having an angled shoulder 72. The angled shoulder 72 is configured to cooperate with the first O-ring 54 to retain the O-ring in a proper position. As shown, the end 87 of the rack tube 13 will abut the inner face 47 of the first flange 46 and the O-ring 54 is positioned substantially entirely within the rack tube 13. It should be appreciated that the end of the rack tube 13 can have any suitable shape (curved, flat) such that the O-ring 54 is held in place when the rack bushing seal assembly 44 is assembled with the rack tube 13. Also shown in FIG. 4 is a port 71 formed through the rack tube 13. In the preferred embodiment, the port 71 forms an opening that is configured to be connected to the hydraulic line 27 such that hydraulic fluid can be transported into the rack chamber 24. Using this configuration, a weld stud 88 is conventionally added so that the hydraulic line 27 can be threaded to the port 71 to create a fluid flow path.

Figure 5:
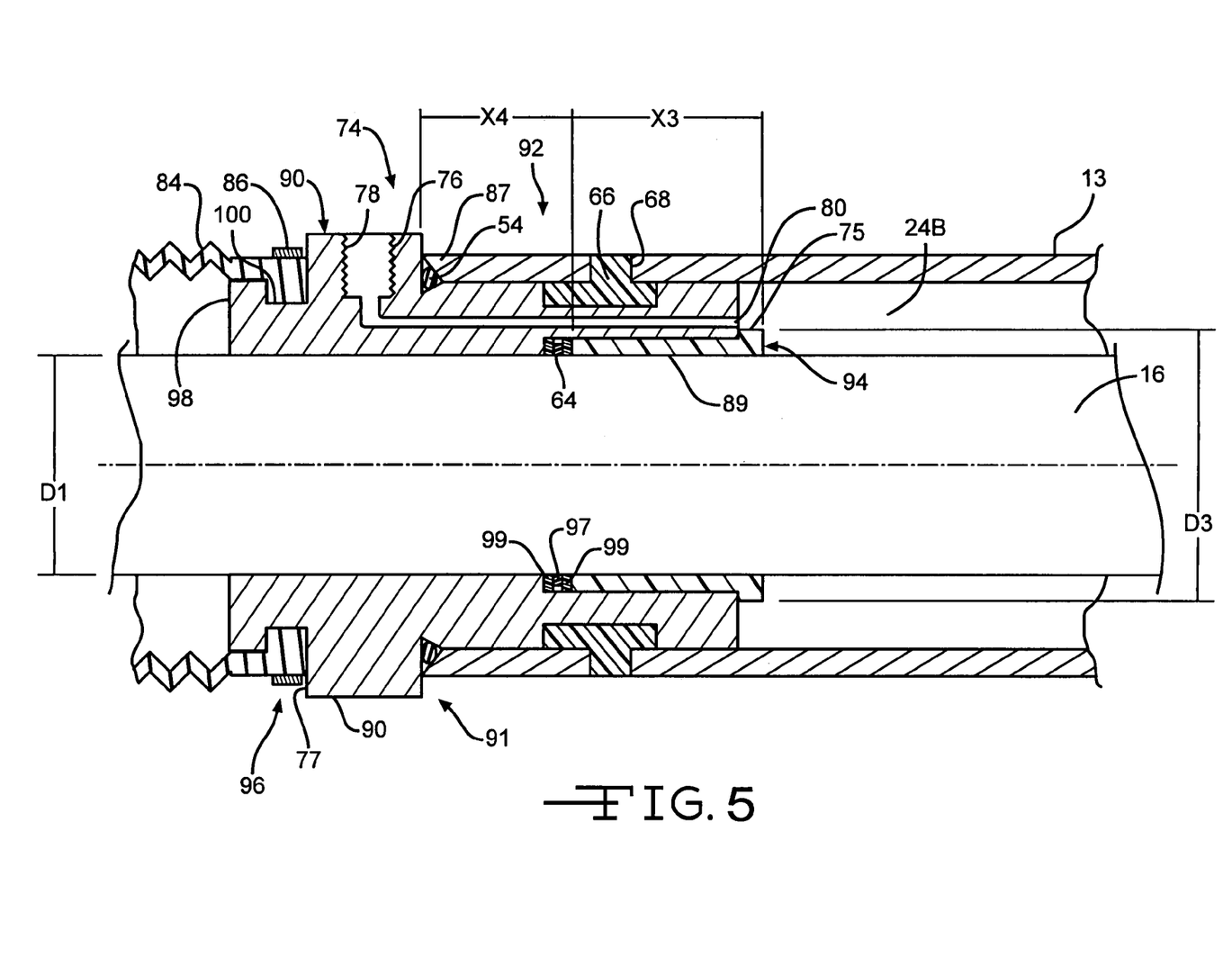
FIG. 5 is a enlarged sectional view of a portion of the rack and pinion steering assembly having a rack bushing seal assembly according to an alternate embodiment of the present invention.

Illustrated in FIG. 5, and using like reference numerals to indicate corresponding parts, there is shown an enlarged sectional view of an alternate embodiment of a rack bushing seal assembly 92 according to the present invention. It should be appreciated that a bushing 74 used with this embodiment of the rack bushing seal assembly 92 would be implemented in substantially the same manner as the bushing 45 is used with the rack bushing seal assembly 44, but with the modifications described below. In this embodiment of the rack bushing seal assembly 92, the bushing 74 includes a pressure port 76 that is molded within a first flange 90 of the bushing 74. The pressure port 76 preferably includes a threaded portion 78 and a channel portion 80.

In this embodiment of the bushing 74, the threaded portion 78 is configured to receive a hydraulic fitting (not shown) to connect one of the hydraulic lines 27, described above, to the rack tube 13. Additionally, the channel portion 80 will create a path for the fluid flow into the rack chamber 24B through the bushing 74. Using the threaded pressure port 76 can eliminate the need to use a weld stud to connect the hydraulic line to the rack tube 13 thereby reducing labor and material costs.

Formed at an outer end 77 of the first flange 90 of the bushing is a flange extension 96. The flange extension 96 is used in this embodiment to provide a locating and connection means for the bellows 84. The flange extension 96 includes a rim 98. The rim 98 is similar to the lip 82 of the bushing 45 described above, in that both the lip 82 and the rim 98 act as a locator for the bellows 84. Adjacent the rim 98 is a recess 100 that is configured to accommodate a front portion of the bellows 84. Additionally, a clamp 86 could also be positioned about the bellows 84 within the recess 100 to retain the bellows 84 therewith. It should be appreciated that although a relative height difference is shown between the recess 100 and the rim 98, the exact configuration of the rim 98 and recess 100 can be altered to accommodate any desired design requirement.

A second bushing liner 94 is also used with this embodiment of the rack bushing seal assembly 92. The second bushing liner 94 also includes a second annular flange 75 that is similar to the annular flange 62 of the bushing liner 58 described above. However, in this embodiment, the second annular flange 75 would have a smaller outer diameter, D3, so that the second annular flange 75 does not block the channel portion 80 of bushing 74.

One advantage of the rack bushing seal assemblies 44 and 92 of the present invention is that the inner surfaces 65 and 89 of the bushing liners 58 and 94, respectively, can be configured so as to allow them to be in contact with the fluid that is in the rack chamber 24B. Due to the position of the prior art seal assembly 17, the bushing 35 and seal portion 37 on the rack 16 the passage of fluid into the retaining cap 23 is substantially prevented. Therefore, a portion of the prior art rack 16 that corresponds to a length X of the associated seal assembly 17 is substantially dry. According to the present invention, an increased portion of the rack 16 that corresponds to a length X1 is in contact with the fluid from the rack chamber 24B since the O-ring 64 is closer to the outboard end of the bushing 45 than is the sealing portion of the prior art rack seal assembly 17 illustrated in FIG. 1. A length X2, the remaining length of the rack 16 that is positioned within the rack bushing seal assembly 44, corresponds to the portion of the seal assembly 44 that is substantially isolated from the fluid within the rack chamber 24B. As can be seen in FIG. 5, a length X3 of the rack tube 16 is in contact with the fluid from the rack chamber 24B since the O-ring 64 is closer to the outboard end of the bushing 74 than is the sealing portion of the prior art rack seal assembly 17. A length X4, the remaining length of the rack 16 that is positioned within the rack bushing seal assembly 92, corresponds to the portion of the seal assembly 92 that is substantially isolated from the fluid within the rack chamber 24B.

In FIGS. 4 and 5, the lengths of the rack 16 that are isolated from fluid in the rack chamber 24B are X2 and X4, respectively. It can be appreciated that the lengths X2 and X4 are less than the length X of the portion of the rack 16 that is positioned within the prior art rack seal assembly 17. Therefore, less of the rack 16 is isolated from fluid contact when the rack bushing seal assemblies 44 and 92 according to the present invention are used. Having more of the surface of the rack 16 in contact with the fluid will allow the rack 16 to move with less friction within the rack bushing seal assemblies 44 and 92. Having reduced friction can assist with the movement of the rack 16 as well as the returnability of the rack to a neutral position when a steering maneuver is completed.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A rack bushing seal assembly for a rack and pinion steering assembly having a rack tube comprising:
   a bushing having an outer surface provided with a recess;
   a bushing liner disposed adjacent the bushing;
   a locking material disposed within and filling at least a portion of the recess for retaining the rack bushing seal assembly in the rack tube; and
   a first opening in the rack tube that is substantially aligned with the annular recess wherein the locking material is introduced into the annular recess via the first opening.

2. The rack bushing seal assembly defined in claim 1 wherein the rack tube includes a channel that is aligned with the first opening and the annular recess, wherein the locking material substantially fills the channel and the annular recess to retain the rack bushing seal assembly with the rack tube.

3. The rack bushing seal assembly defined in claim 2 further including a second opening in the rack tube positioned substantially opposite the first openings, wherein a vacuum is created at the second opening to draw the locking material around the annular recess and the channel.

4. The rack bushing seal assembly defined in claim 1 further including a rack, a first O-ring positioned on the outer surface of the bushing, and a second O-ring positioned between the bushing and the bushing liner, wherein the first O-ring seals a joint between the bushing and the rack tube and the second O-ring seals a joint between the bushing and the bushing liner to form a seal against the rack.

5. The rack bushing seal assembly defined in claim 4 wherein the second O-ring is a quad-O-ring.

6. The rack bushing seal assembly defined in claim 4 wherein the bushing defines a first inner surface and the bushing liner defines a second inner surface, the first and second inner surfaces configured to engage an outer surface of the rack; and
   wherein the second inner surface and a portion of the rack corresponding to the length of the bushing liner are in fluid communication with the rack tube.

7. The rack bushing seal assembly defined in claim 1 wherein the bushing includes a first flange having an outer diameter that is larger than an outer diameter of the rack tube thereby defining a lip such that the lip is used as a locator mechanism for a bellows.

8. The rack bushing seal assembly defined in claim 1 wherein the bushing liner is made of a low friction material.

9. The rack bushing seal assembly defined in claim 1 wherein the bushing and the bushing liner are press fit together.

10. A rack bushing seal assembly for a rack and pinion steering assembly having a rack tube comprising:
    a bushing having an outer surface provided with a recess;
    a bushing liner disposed adjacent the bushing;
    a locking material disposed within and filling at least a portion of the recess for retaining the rack bushing seal assembly in the rack tube;
    and further including a rack, a first O-ring positioned on the outer surface of the bushing, and a second O-ring positioned between the bushing and the bushing liner, wherein the first O-ring seals a joint between the bushing and the rack tube and the second O-ring seals a joint between the bushing and the bushing liner to form a seal against the rack;
    wherein the bushing defines a first inner surface and the bushing liner defines a second inner surface, the first and second inner surfaces configured to engage an outer surface of the rack;
    wherein the second inner surface and a portion of the rack corresponding to the length of the bushing liner are in fluid communication with the rack tube; and
    wherein the second O-ring is a quad-O-ring.

11. The rack bushing seal assembly defined in claim 10 wherein the rack tube includes a channel that is aligned with the first opening and the annular recess wherein the locking material substantially fills the channel and the annular recess to retain the rack bushing seal assembly with the rack tube.

12. The rack bushing seal assembly defined in claim 11 further including a second opening in the rack tube positioned substantially opposite the first opening wherein a vacuum is created at the second opening to draw the locking material around the annular recess and the channel.

13. The rack bushing seal assembly defined in claim 10 wherein the bushing includes a first flange having an outer diameter that is larger than an outer diameter of the rack tube thereby defining a lip such that the lip is used as a locator mechanism for a bellows.

14. The rack bushing seal assembly defined in claim 10 wherein the bushing liner is made of a low friction material.

15. The rack bushing seal assembly defined in claim 10 wherein the bushing and the bushing liner are press fit together.

16. A rack bushing seal assembly for a rack and pinion steering assembly having a rack tube comprising:
    a bushing having an outer surface provided with a recess;
    a bushing liner disposed adjacent the bushing;
    a locking material disposed within and filling at least a portion of the recess for retaining the rack bushing seal assembly in the rack tube;
    and further including a rack, a first O-ring positioned on the outer surface of the bushing, and a second O-ring positioned between the bushing and the bushing liner, wherein the first O-ring seals a joint between the bushing and the rack tube and the second O-ring seals a joint between the bushing and the bushing liner to form a seal against the rack;
    wherein the bushing defines a first inner surface and the bushing liner defines a second inner surface, the first and second inner surfaces configured to engage an outer surface of the rack; and wherein the second inner surface and a portion of the rack corresponding to the length of the bushing liner are in fluid communication with the rack tube.

17. The rack bushing seal assembly defined in claim 16 wherein the rack tube includes a channel that is aligned with the first opening and the annular recess wherein the locking material substantially fills the channel and the annular recess to retain the rack bushing seal assembly with the rack tube.

18. The rack bushing seal assembly defined in claim 17 further including a second opening in the rack tube positioned substantially opposite the first opening wherein a vacuum is created at the second opening to draw the locking material around the annular recess and the channel.

19. The rack bushing seal assembly defined in claim 16 wherein the bushing includes a first flange having an outer diameter that is larger than an outer diameter of the rack tube thereby defining a lip such that the lip is used as a locator mechanism for a bellows.

20. The rack bushing seal assembly defined in claim 16 wherein the bushing liner is made of a low friction material.

21. The rack bushing seal assembly defined in claim 16 wherein the bushing and the bushing liner are press fit together.

* * * * *